US007486370B2

(12) United States Patent
Choi

(10) Patent No.: US 7,486,370 B2
(45) Date of Patent: Feb. 3, 2009

(54) LIQUID CRYSTAL DISPLAY DEVICE HAVING PATTERNED SPACER

(75) Inventor: Sang-Ho Choi, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 165 days.

(21) Appl. No.: 10/745,537

(22) Filed: Dec. 29, 2003

(65) Prior Publication Data

US 2004/0135959 A1 Jul. 15, 2004

(30) Foreign Application Priority Data

Dec. 30, 2002 (KR) ..................... 10-2002-0086538

(51) Int. Cl.
*G02F 1/1339* (2006.01)

(52) U.S. Cl. ....................................... 349/155; 349/123

(58) Field of Classification Search .......... 349/155–157
See application file for complete search history.

(56) References Cited

U.S. PATENT DOCUMENTS 5,566,009 A * 10/1996 Yamazaki et al. ............. 349/86
6,201,592 B1 * 3/2001 Terashita et al. ............ 349/156
6,469,765 B1 * 10/2002 Matsuyama et al. ......... 349/143
6,762,818 B2 * 7/2004 Yamada ...................... 349/155
6,850,309 B2 * 2/2005 Inoue et al. ................. 349/157
6,859,249 B2 * 2/2005 Freeman ..................... 349/155
7,277,151 B2 * 10/2007 Ryu et al. ................... 349/155
2003/0002004 A1 * 1/2003 Kouya ........................ 349/155

* cited by examiner

*Primary Examiner*—Richard H Kim
(74) *Attorney, Agent, or Firm*—McKenna Long & Aldridge LLP

(57) ABSTRACT

A liquid crystal display device includes first and second substrates spaced apart from and facing each other; a gate line on an inner surface of the first substrate; a data line on the inner surface of the first substrate and crossing the gate line; a first patterned spacer in a first direction on the inner surface of the first substrate including the gate and data lines; and a second patterned spacer in a second direction on an inner surface of the second substrate and contacting the first patterned spacer, wherein the first patterned spacer and the second patterned spacer cross each other with an angle more than 0 degrees.

30 Claims, 5 Drawing Sheets

RELATED ART

LIQUID CRYSTAL DISPLAY DEVICE HAVING PATTERNED SPACER

This application claims the benefit of Korean Patent Application No. 2002-086538, filed in Korea on Dec. 30, 2002, which is hereby incorporated by reference for all purposes as if fully set forth herein.

BACKGROUND OF THE INVENTION

1. Field of the Invention

The present invention relates to a liquid crystal display (LCD) device and more particularly, to a liquid crystal display (LCD) device having patterned spacers.

2. Discussion of the Related Art

Recently, liquid crystal display (LCD) devices have been widely used for notebook computers and desktop monitors, etc. because of their superior resolution, color image display and quality of displayed images. In general, an LCD device has an upper substrate and a lower substrate, which are spaced apart and facing each other, and a liquid crystal layer disposed between the upper and lower substrates. Each of the substrates includes an electrode, and the electrodes of each substrate are also facing each other. The LCD device uses an optical anisotropy of liquid crystal and produces an image by controlling light transmissivity by varying the arrangement of liquid crystal molecules, which are arranged by an electric field.

Because LCD devices have high resolution and can display an excellent moving image, they are widely used. The LCD device typically includes thin film transistors and pixel electrodes arranged in a matrix form. The LCD device is referred to as an active matrix liquid crystal display (AMLCD).

The LCD device is fabricated by forming a lower substrate, referred to as an array substrate, having thin film transistors (TFTs) and pixel electrodes; forming an upper substrate, referred to as a color filter substrate, having common electrodes and color filters; forming a liquid crystal cell by aligning and attaching the substrates; injecting liquid crystal materials and sealing; and attaching a polarization film.

FIG. 1 is a cross-sectional view illustrating a conventional liquid crystal display (LCD) device. In FIG. 1, the conventional LCD device has upper and lower substrates 10 and 30, which are spaced apart and facing each other, and also has a liquid crystal layer 50 interposed between the upper and lower substrates 10 and 30.

A gate electrode 32 is formed on the inside of the lower substrate 30, and a gate insulating layer 34 covers the gate electrode 32. An active layer 36 is formed on the gate insulating layer 34 over the gate electrode 32, and an ohmic contact layer 37 is formed on the active layer 36. Next, source and drain electrodes 38 and 40 spaced apart from each other are formed on the ohmic contact layer 37. The gate electrode 32, the active layer 36, the source electrode 38, and the drain electrode 40 constitute a thin film transistor T. The active layer 36 between the source and drain electrodes 38 and 40 becomes a channel CH of the thin film transistor T.

Although not shown in the figure, a gate line, which is connected to the gate electrode 32, is formed in a first direction and a data line, which is connected to the source electrode 38, is formed in a second direction. The gate line and the data line cross each other, and define a pixel region P.

Next, a passivation layer 42 is formed on the thin film transistor T. The passivation layer 42 has a drain contact hole 44 exposing the drain electrode 40. A pixel electrode 48 is formed in the pixel region P on the passivation layer 42. The pixel electrode 48 is connected to the drain electrode 40 through the drain contact hole 44.

A black matrix 12, which has an opening corresponding to the pixel electrode 48, is formed on the inside of the upper substrate 10. A color filter layer 14, which transmits only light having a certain color corresponding to the opening of the black matrix 12, is formed on the black matrix 12. The color filter layer 14 includes three sub-color filters of red (R), green (G) and blue (B). Each color filter corresponds to respective pixel electrodes 48. The black matrix 12 covers the thin film transistor T and thus prevents light from going into the channel CH of the thin film transistor T. In addition, the black matrix 12 blocks light leakage in a border portion between adjacent sub-color filters 14. Subsequently, a transparent common electrode 16 is formed on the color filter 14 as an electrode for applying voltage to the liquid crystal layer 50.

A seal pattern 52 is formed in a peripheral portion between the upper and lower substrates 10 and 30. The seal pattern 52 prevents liquid crystal materials of the liquid crystal layer 50 from leaking.

Meanwhile, a ball spacer 54 is formed in the pixel region P between the upper and lower substrates 10 and 30 to maintain uniform cell gap with the seal pattern 52.

Although not shown in the figure, alignment layers are formed on the pixel electrode 48 and the common electrode 16, respectively, to arrange liquid crystal molecules of the liquid crystal layer 50.

The ball spacer 54 may be made of glass wool or organic material having elasticity to outer pressure. By the way, ball spacers may cause the following problems because the ball spacers are randomly scattered on a substrate.

First, the alignment layers become bad due to movements of the ball spacers. Second, light leakage may occur around the ball spacers by absorptive forces between the liquid crystal molecules adjacent to the ball spacers. Third, when the ball spacers are used in a large sized liquid crystal display device, it is hard to maintain stable cell gap. Fourth, since the ball spacers have elasticity and are not fixed, ripple phenomena may happen when a screen is touched. As a result, in a liquid crystal display device, which maintains the cell gap by using the ball spacers, high quality images are difficult to achieve.

To solve the problems, patterned spacers, which may be formed through a photolithography process, have been proposed and developed. The patterned spacers enable-uniform cell gap to be maintained. Because the patterned spacers can be fixedly formed in non-pixel area, the patterned spacers can block light leakage around themselves and the device can be solid. Additionally, in the case of requiring narrow cell gap, the cell gap of the device can be minutely controlled by the patterned spacers. Furthermore, when the screen is touched, a ripple phenomena can be prevented.

FIG. 2 is a schematic cross-sectional view of a liquid crystal display device having a patterned spacer according to the related art.

As shown in FIG. 2, an upper substrate 60 and a lower substrate 70 are spaced apart from and facing each other. A thin film transistor T and a pixel electrode 72 are formed on an inner surface of the lower substrate 70. The pixel electrode 72 is connected to the thin film transistor T and is made of a transparent conductive material. A black matrix 62 is formed on an inner surface of the upper substrate 60 to cover the thin film transistor T, and a color filter layer 64 is formed on the black matrix 62. A common electrode 66 made of the same material as the pixel electrode 72 is formed on the color filter layer 64.

To maintain a uniform cell gap between the upper and lower substrates 60 and 70, a pattern spacer 74 is formed to correspond to the black matrix 62 and the thin film transistor T.

A liquid crystal layer 80 is interposed between the upper and lower substrates 60 and 70. Although not shown in the figure, upper and lower alignment layers are formed on the pixel electrode 72 and the common electrode 66, respectively.

In the related art, the patterned spacer is formed on either the upper substrate 60 or the lower substrate 70, and then the upper and lower substrates 60 and 70 are attached by using the patterned spacer, whereby a certain cell gap is formed between the upper and lower substrates 60 and 70.

The thickness of the patterned spacer grows thick in proportion to the cell gap, and the accuracy of a pattern is decreased as the patterned spacer becomes thick. Therefore, a uniform cell gap is hard to achieve due to poor planarization characteristics, and badly rubbed portions are increased.

FIG. 3 is a schematic cross-sectional view of showing a process rubbing a substrate for a liquid crystal display device according to the related art, and the substrate includes an alignment layer.

As shown in FIG. 3, a patterned spacer 84 is formed on a substrate 82, and an alignment layer 86 is formed on an entire surface of the substrate 82 to cover the patterned spacer 84.

A rubbing process is performed to form grooves on the surface of the alignment layer 86 in a certain direction by using a rubbing fabric 88. At this time, a portion C adjacent to a side of the patterned spacer 84, which is disposed behind the patterned spacer 84 with respect to a rubbing direction, is not rubbed or is irregularly rubbed. Moreover, the portion C grows wider as a thickness H of the patterned spacer increases. For example, if the patterned spacer has a thickness of about 5 μm, the poorly rubbed portion around the patterned spacer may have a size within a range of about 7 μm to about 8 μm.

Since the poorly rubbed portion should be covered with the black matrix, the aperture ratio of the device is lowered due to an increasing size of the black matrix. On the other hand, the patterned spacer is not suitable in a device having a cell gap of more than 5 μm.

SUMMARY OF THE INVENTION

Accordingly, the present invention is directed to a liquid crystal display device having patterned spacers that substantially obviates one or more of problems due to limitations and disadvantages of the related art.

An advantage of the present invention is to provide a liquid crystal display device having patterned spacers that improves aperture ratio and contrast ratio.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates spaced apart from and facing each other; a gate line on an inner surface of the first substrate; a data line on the inner surface of the first substrate and crossing the gate line; a first patterned spacer in a first direction on the inner surface of the first substrate including the gate and data lines; and a second patterned spacer in a second direction on an inner surface of the second substrate and contacting the first patterned spacer, wherein the first patterned spacer and the second patterned spacer cross each other with an angle more than 0 degrees.

In another aspect of the present invention, a liquid crystal display device includes a first substrate; a gate line on the first substrate; a data line on the first substrate and crossing the gate line to define a pixel region; a thin film transistor at a crossing of the gate and data lines; a pixel electrode in the pixel region connected to the thin film transistor; a first patterned spacer in a first direction on the first substrate including the pixel electrode; a second substrate spaced apart from and facing the first substrate; a common electrode on a surface of the second substrate and facing the pixel electrode; a second patterned spacer in a second direction on the common electrode and contacting the first patterned spacer; and a liquid crystal layer interposed between the pixel electrode and the common electrode, wherein the first patterned spacer and the second patterned spacer cross each other with an angle more than 0 degrees.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
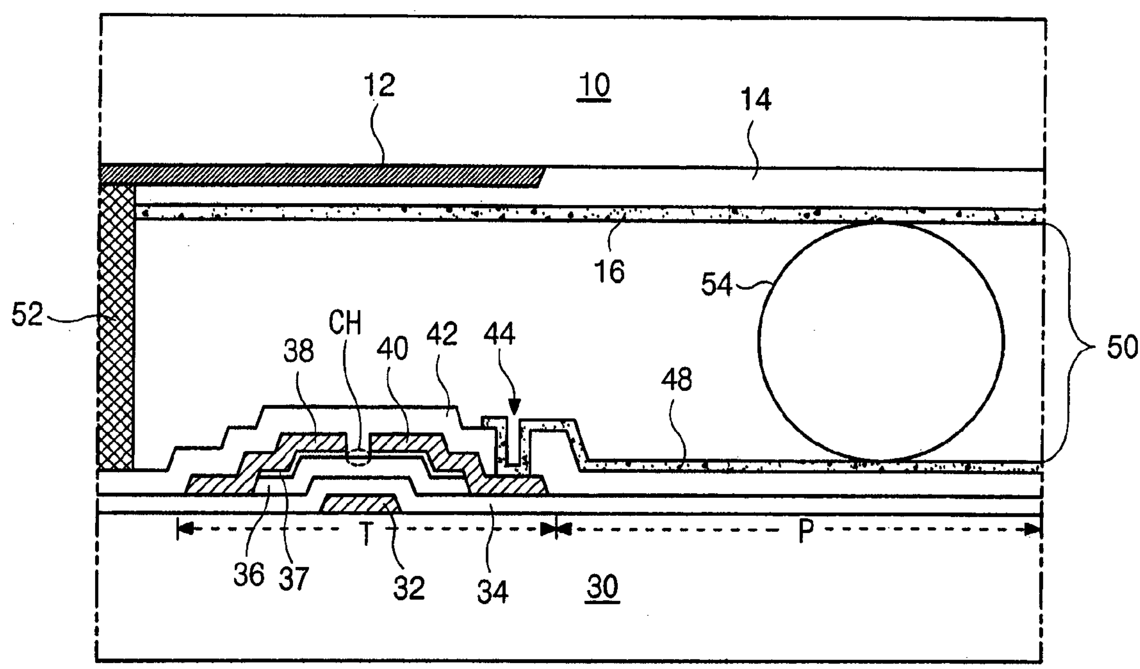
FIG. 1 is a cross-sectional view illustrating a conventional liquid crystal display (LCD) device.
Figure 2:
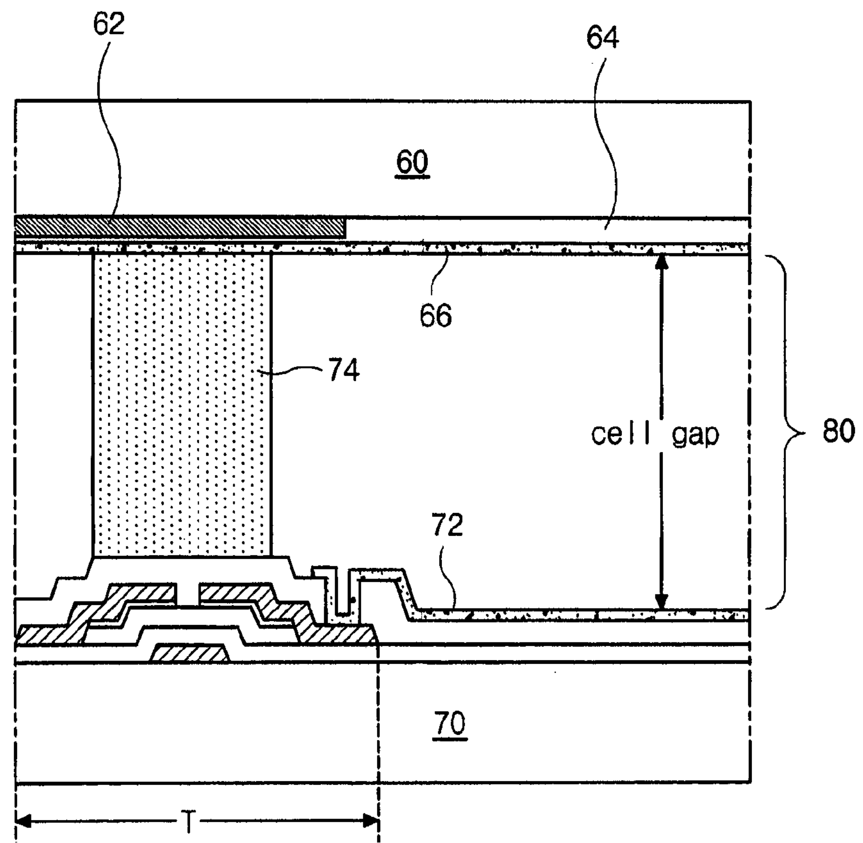
FIG. 2 is a schematic cross-sectional view of a liquid crystal display device having a patterned spacer according to the related art.
Figure 3:
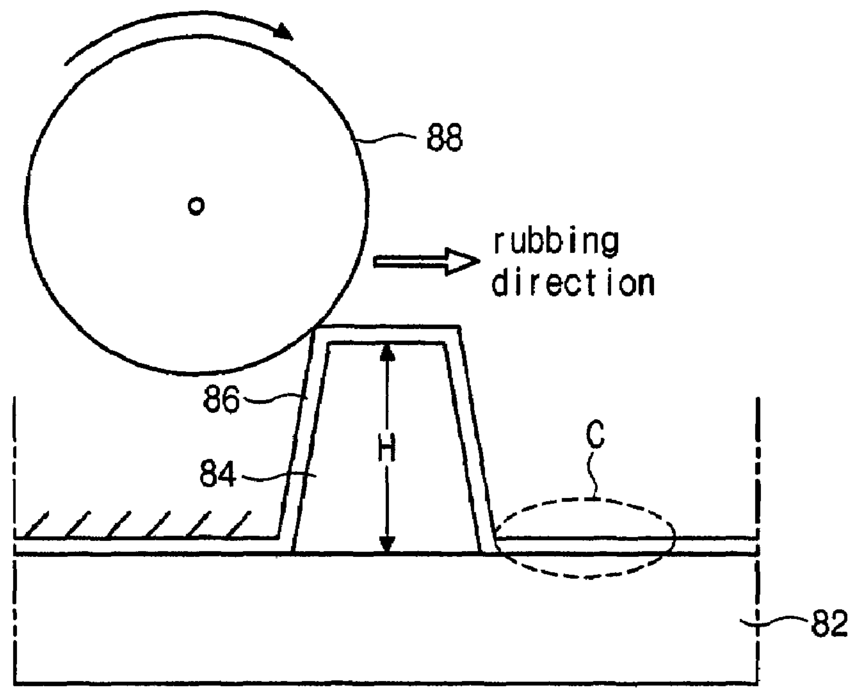
FIG. 3 is a schematic cross-sectional view showing a process for rubbing a substrate for a liquid crystal display device according to the related art.
Figure 4:
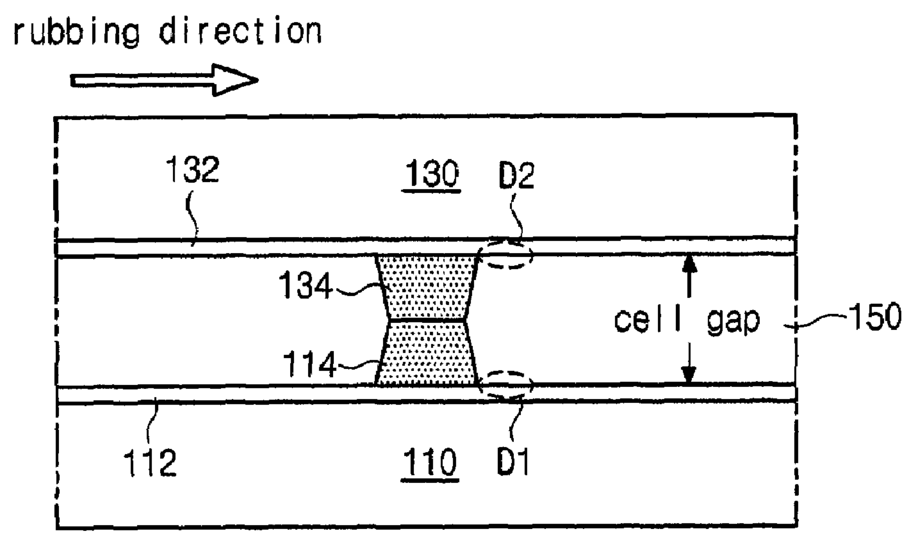
FIG. 4 is a schematic cross-sectional view of a liquid crystal display device having a patterned spacer according to an embodiment of the present invention.

FIG. 4 is a schematic cross-sectional view of a liquid crystal display device having patterned spacers according to an embodiment of the present invention. As shown in the figure, a first substrate 110 and a second substrate 130 are spaced apart from and facing each other. The first and second substrates 110 and 130 may be made of a transparent insulating material, such as glass. A first transparent electrode 112 is formed on an inner surface of the first substrate 110 and a second transparent electrode 132 is formed on an inner surface of the second substrate 130. A first patterned spacer 114 and a second patterned spacer 134 are formed on the first transparent electrode 112 and the second transparent electrode 132, respectively, to contact each other. A liquid crystal layer 150 is interposed between the first and second transparent electrodes 112 and 132.

A uniform cell gap is formed between the first and second transparent electrodes 112 and 132 corresponding to the sum of the thicknesses of the first and second patterned spacers 114 and 134. Although not shown in the figure, alignment layers are formed on the substrates 110 and 130 including the patterned spacers 114 and 134. The alignment layers may be rubbed in the same direction.

At this time, a first poorly rubbed portion D1 around the first patterned spacer 114 and a second poorly rubbed portion D2 around the second patterned spacer 134 are formed and are facing each other. By the way, because the thicknesses of the first and second patterned spacers 114 and 134 are thinner than the thickness of the related art patterned spacer, the first and second poorly rubbed portions D1 and D2 are smaller than the poorly rubbed portion of the related art. Therefore, the aperture ratio and the contrast ratio may be improved.

Although not shown in the figure, the first transparent electrode 112, as a pixel electrode, is patterned at each pixel and is connected to a thin film transistor, as a switching element. In addition, a color filter layer including sub-color filters of R, G and B and a black matrix between adjacent sub-color filters may be formed between the second transparent substrate 130 and the second transparent electrode 132.

The first and second patterned spacers 114 and 134 may be formed through a photolithography process using photoresist.

Figure 5A:
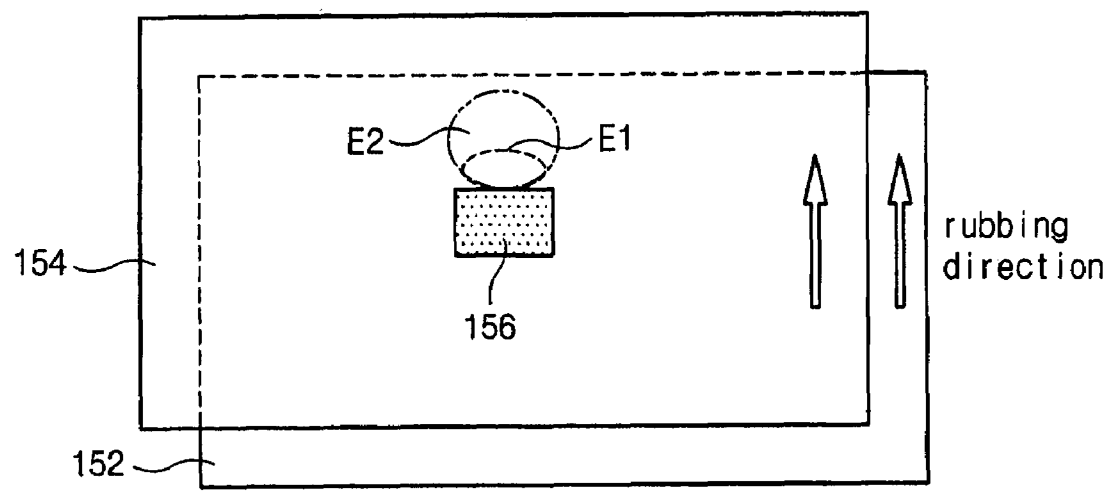
FIGS. 5A and 5B are schematic plan views of a liquid crystal display device according to the embodiment of the present invention.
Figure 5B:
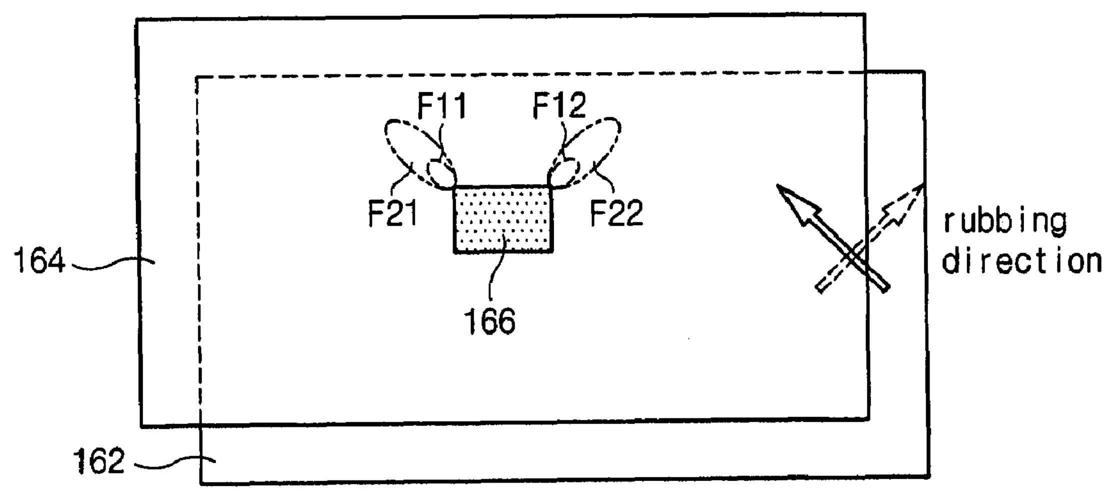

FIGS. 5A and 5B are schematic plan views of a liquid crystal display device according to the embodiment of the present invention. FIG. 5A shows the liquid crystal display device having alignment layers rubbed in the same direction and FIG. 5B shows the liquid crystal display device having alignment layers rubbed in different directions perpendicular to each other. In the figures, only one patterned spacer is illustrated for convenience of an explanation.

In FIG. 5A, first and second substrates 152 and 154 have alignment layers (not shown) rubbed in the same direction. In the present invention, patterned spacers 156 are formed on respective substrates, wherein the patterned spacer 156 on each substrate may have half thickness of the related art patterned spacer. Additionally, a poorly rubbed portion E1 is formed in the same position on each substrate. Thus, since the step of the patterned spacer 156 is lowered, a poorly rubbed portion E1 formed around the patterned spacer 156 in the present invention is smaller than the poorly rubbed portion E2 in the related art.

In FIG. 5B, first and second substrates 162 and 164 have alignment layers (not shown) rubbed in different directions perpendicular to each other as in a twisted nematic (TN) mode. In this case, first and second poorly rubbed portions F11 and F12 are formed at both sides of patterned spacers 166, which may be composed of first and second patterned spacers on the first and second substrates 162 and 164, respectively. The first and second poorly rubbed portions F11 and F12 are very small as compared with the poorly rubbed portions F21 and F22 of the related art.

The patterned spacers may also have various shapes.

Figure 6:
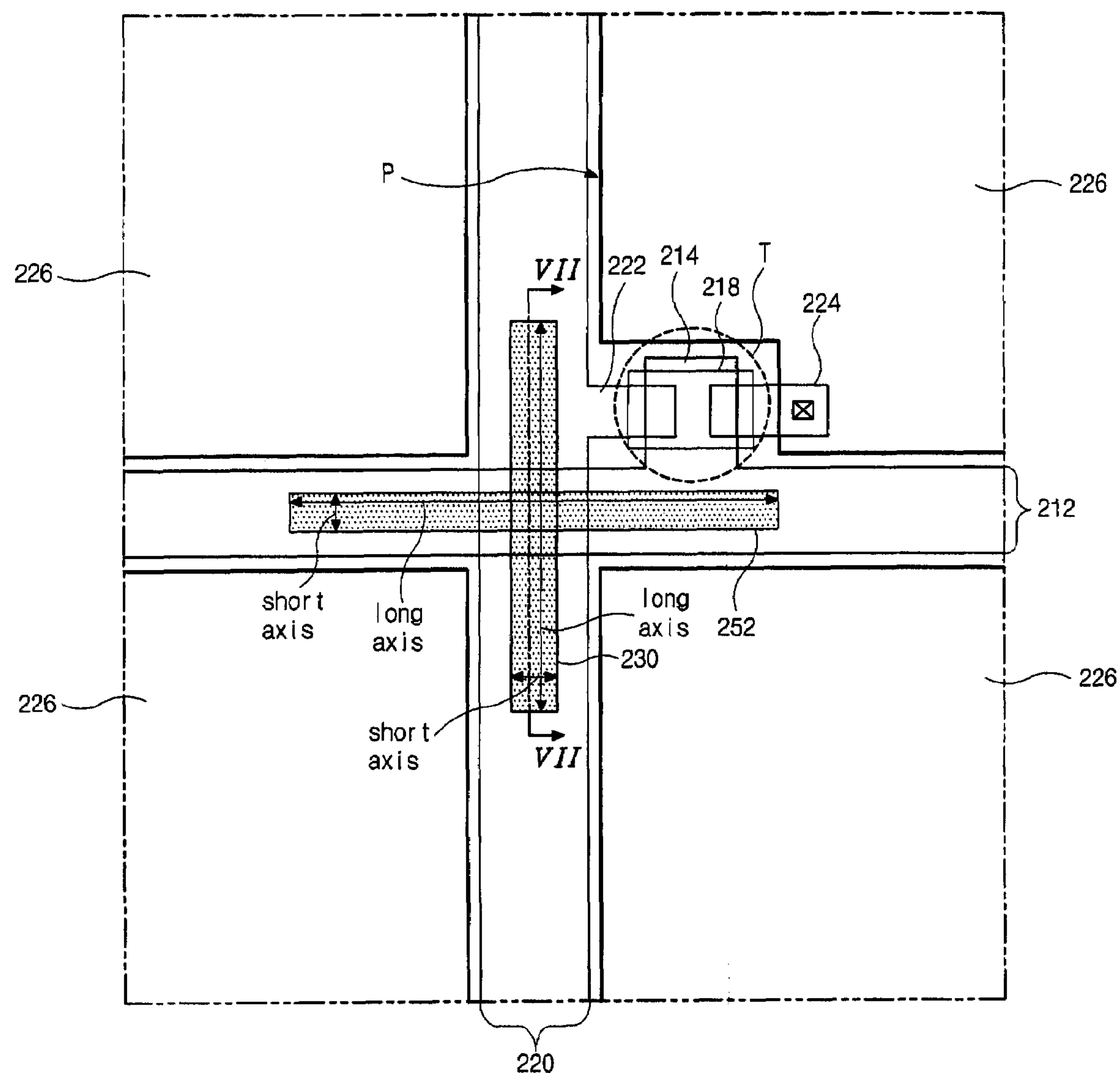
FIG. 6 is a schematic plan view of a liquid crystal display device having patterned spacers according to another embodiment of the present invention.

FIG. 6 is a schematic plan view of a liquid crystal display device having patterned spacers according to another embodiment of the present invention, and mainly shows an array substrate of the liquid crystal display device.

As illustrated in FIG. 6, a gate line 212 is formed in a first direction and a data line 220 is formed in a second direction crossing the first direction. The gate line 212 and the data line 220 cross each other and define a pixel region P.

A thin film transistor T is formed at the crossing of the gate line 212 and the data line 220. A pixel electrode 226 is formed in the pixel region P and is connected to the thin film transistor T. The thin film transistor T includes a gate electrode 214, which is extended from the gate line 212, a source electrode 222, which is extended from the data line 220, a drain electrode 224, which is spaced apart from the source electrode 222, and a semiconductor layer 218, which overlaps the gate electrode 214, the source electrode 222 and the drain electrode 224 and has an island shape.

Meanwhile, on the crossing of the gate line 212 and the data line 220, a first patterned spacer 230 and a second patterned spacer 252 are formed to cross each other. The first patterned spacer 230 is formed in the second direction, that is, parallel to the data line 220, and the second patterned spacer 252 is formed in the first direction, that is, parallel to the gate line 212. The first patterned spacer 230 corresponds to the data line 220 and the second patterned spacer 252 corresponds to the gate line 212. Although not shown in the figure, the first patterned spacer 230 is formed on a first substrate, which includes the thin film transistor T and the pixel electrode 226, and the second patterned spacer 252 is formed on a second substrate, which is spaced apart from and facing the first substrate.

The first and second patterned spacers 230 and 252 may have rod shapes. As stated above, a long axis of the first patterned spacer 230 is parallel to the second direction and a long axis of the second patterned spacer 252 is parallel to the first direction. In FIG. 6, the long axes of the first and second spacers 230 and 252 cross each other at a right angle, and thus nonattachment or unstable attachment between the patterned spacers can be prevented. In the embodiment of the present invention, although the long axes of the first and second patterned spacers 230 and 252 have a crossing angle of 90 degrees, the long axes of the first and second patterned spacers 230 and 252 may cross each other with another angle. That is, the long axes of the first and second patterned spacers 230 and 252 may have a crossing angle more than 0 degrees. Therefore, the alignment margin for attaching the two substrates of the liquid crystal display device may be increased.

Figure 7:
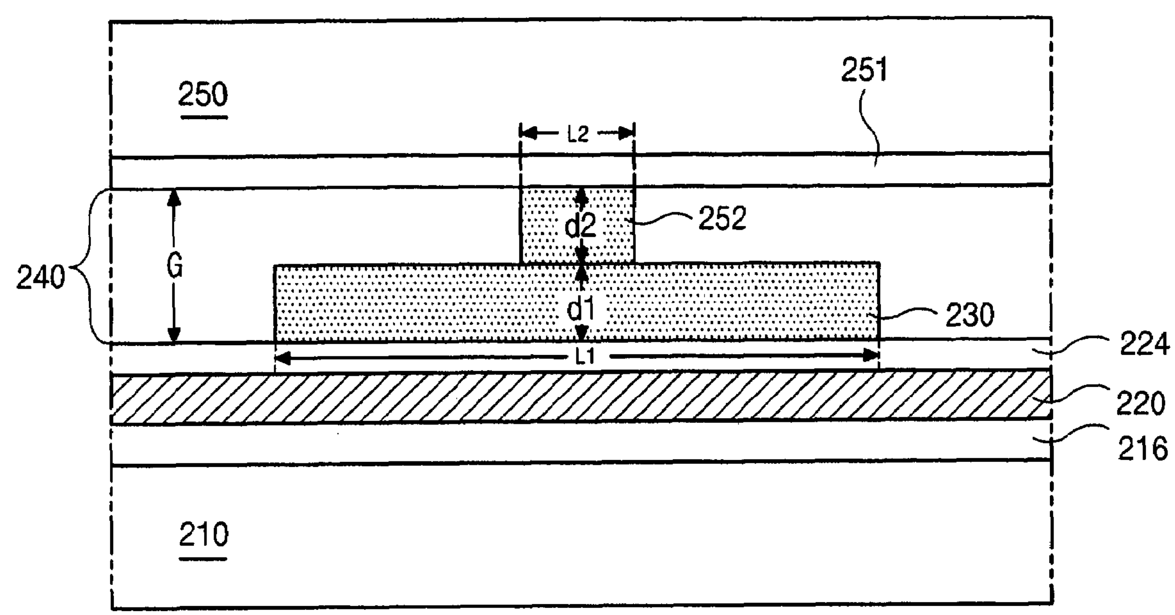
FIG. 7 is a cross-sectional view along the line VII-VII of FIG. 6.

FIG. 7 is a cross-sectional view along the line VII-VII of FIG. 6. In FIG. 7, a first substrate 210 and a second substrate 250 are spaced apart from and facing each other. An insulating layer 216, a data line 220 and a passivation layer 224 are subsequently formed on an inner surface of the first substrate 210 and a first patterned spacer 230 is formed on the passivation layer 224 over the data line 220. The first patterned spacer 230 has a first length L1, which corresponds to a length of the long axis direction. A common electrode 251 is formed on an inner surface of the second substrate 250 and a second patterned spacer 252 is formed on the common electrode 251. The second patterned spacer 252 has a second length, which corresponds to a length of the short axis direction. The second patterned spacer 252 contacts the first patterned spacer 230, and more particularly in a middle portion of the first patterned spacer 230.

A liquid crystal layer 240 is interposed between the common electrode 251 and the passivation layer 224, actually between the common electrode 251 and a pixel electrode (not shown) that may be formed on the passivation layer 224. A thickness of the liquid crystal layer 240 may be defined as a cell gap G. The cell gap G is the sum of a thickness d1 of the first patterned spacer 230 and a thickness d2 of the second patterned spacer 252, that is, d1+d2.

On the other hand, the patterned spacers of the present invention may be used in an optically compensated birefringence or optically compensated bend (OCB) mode liquid crystal display device, which has a splay structure when driving voltage is not applied and a bend structure when driving voltage is applied. In the OCB mode liquid crystal display device having the patterned spacers of the present invention, liquid crystal molecules around the patterned spacers are arranged vertically with respect to substrates of the device, and thus liquid crystal molecules of the liquid crystal layer can be changed in short time from the splay structure into the bend structure.

In addition, to prevent retardation of a phase difference, the OCB mode liquid crystal display device may have a high cell gap of about 5 μm to about 6 m. By the way, if the patterned spacers of the present invention may be used in the OCB mode liquid crystal display device, a thickness of the patterned spacer on each substrate may be decreased. Because this may also reduce the thickness variation in a photolithography process using photoresist, planarizing characteristics may be improved. Thus, a uniform cell gap may be provided.

Moreover, because the poorly rubbed portions are minimized due to the patterned spacers of the present invention, the aperture ratio may be improved and since light leakage is prevented, the contrast ratio may be increased. Accordingly, image quality is improved.

A liquid crystal display device including the patterned spacers of the present invention has the following advantages.

First, because poorly rubbed portions around the patterned spacer are decreased by lowering a thickness of each patterned spacer on each substrate, a width of a black matrix may be reduced and the aperture ratio and the contrast ratio may be improved. Second, the patterned spacers of the present invention may be easily used in a liquid crystal display device having a high cell gap. Third, if the patterned spacers of the present invention are used in an optically compensated birefringence (OCB) mode liquid crystal display device, the driving voltage of the device may be lowered due to the patterned spacers. Fourth, the planarizing characteristics of the patterned spacers are improved, and thus a uniform cell gap may be provided. Fifth, because the alignment margin is increased by disposing the patterned spacers such that long axes of the patterned spacers may have a crossing angle more than 0 degree, nonattachment or unstable attachment between the patterned spacers may be prevented It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

first and second substrates spaced apart from and facing each other;

a gate line on an inner surface of the first substrate;

a data line on the inner surface of the first substrate and crossing the gate line;

a first patterned spacer in a first direction on the inner surface of the first substrate including the gate and data lines;

a first alignment layer on an interior region of the first patterned spacer;

a second patterned spacer in a second direction on an inner surface of the second substrate and crossing the first patterned spacer; and a second alignment layer on an interior region of the second patterned spacer, wherein the first patterned spacer and the second patterned spacer cross each other with an angle more than 0 degrees.

2. The device according to claim 1, wherein the first and second alignment layers are on the inner surfaces of the first and second substrates, respectively, and wherein the first and second alignment layers are rubbed in substantially the same direction.

3. The device according to claim 1, further comprising first and second alignment layers on the inner surfaces of the first and second substrates, respectively, wherein the first and second alignment layers are rubbed in directions perpendicular to each other.

4. The device according to claim 1, further comprising a liquid crystal layer interposed between the first and second substrates, wherein a thickness of the liquid crystal layer is equal to a sum of thicknesses of the first and second patterned spacers.

5. The device according to claim 4, wherein the thickness of the liquid crystal layer is within a range of about 5 μm to about 6 μm.

6. The device according to claim 4, wherein the liquid crystal layer has a splay structure when driving voltage is not applied and has a bend structure when driving voltage is applied.

7. A liquid crystal display device, comprising:

first and second substrates spaced apart from and facing each other;

a gate line on an inner surface of the first substrate;

a data line on the inner surface of the first substrate and crossing the gate line;

a first patterned spacer in a first direction on the inner surface of the first substrate including the gate and data lines;

a first alignment layer on an interior region of the first patterned spacer;

a second patterned spacer in a second direction on an inner surface of the second substrate and contacting the first patterned spacer; and a second alignment layer on an interior region of the second patterned spacer, wherein the first patterned spacer and the second patterned spacer cross each other with an angle more than 0 degrees, and wherein the first patterned spacer is parallel to the data line.

8. The device according to claim 7, wherein the second patterned spacer is parallel to the gate line.

9. The device according to claim 8, wherein the first and second patterned spacers cross each other at about a 90° angle.

10. A liquid crystal display device, comprising:

first and second substrates spaced apart from and facing each other;

a gate line on an inner surface of the first substrate;

a data line on the inner surface of the first substrate and crossing the gate line;

a first patterned spacer in a first direction on the inner surface of the first substrate including the gate and data lines;

a first alignment layer on an interior region of the first patterned spacer;

a second patterned spacer in a second direction on an inner surface of the second substrate and contacting the first patterned spacer; and a second alignment layer on an interior region of the second patterned spacer, wherein the first patterned spacer and the second patterned spacer cross each other with an angle more than 0 degrees, and wherein the first patterned spacer corresponds to the data line.

11. A liquid crystal display device, comprising:

first and second substrates spaced apart from and facing each other;

a gate line on an inner surface of the first substrate;

a data line on the inner surface of the first substrate and crossing the gate line;

a first patterned spacer in a first direction on the inner surface of the first substrate including the gate and data lines;

a first alignment layer on an interior region of the first patterned spacer;

a second patterned spacer in a second direction on an inner surface of the second substrate and contacting the first patterned spacer; and a second alignment layer on an interior region of the second patterned spacer, wherein the first patterned spacer and the second patterned spacer cross each other with an angle more than 0 degrees, and wherein the second patterned spacer corresponds to the gate line.

12. A liquid crystal display device, comprising:

a first substrate;

a gate line on the first substrate;

a data line on the first substrate and crossing the gate line to define a pixel region;

a thin film transistor at a crossing of the gate and data lines;

a pixel electrode in the pixel region connected to the thin film transistor;

a first patterned spacer in a first direction on the first substrate including the pixel electrode;

a first alignment layer on an interior region of the first pattern spacer;

a second substrate spaced apart from and facing the first substrate;

a common electrode on a surface of the second substrate and facing the pixel electrode;

a second patterned spacer in a second direction on the common electrode and crossing the first patterned spacer;

a second alignment layer on an interior region of the second patterned spacer; and a liquid crystal layer interposed between the pixel electrode and the common electrode, wherein the first patterned spacer and the second patterned spacer cross each other with an angle more than 0 degrees.

13. The device according to claim 12, wherein the first and second alignment layers are on the pixel electrode and the common electrode, respectively, and wherein the first and second alignment layers are rubbed in substantially the same direction.

14. The device according to claim 12, further comprising first and second alignment layers on the pixel electrode and the common electrode, respectively, wherein the first and second alignment layers are rubbed in directions perpendicular to each other.

15. The device according to claim 12, wherein a thickness of the liquid crystal layer is equal to a sum of thicknesses of the first and second patterned spacers.

16. The device according to claim 15, wherein the thickness of the liquid crystal layer is within a range of about 5 μm to about 6 μm.

17. The device according to claim 12, wherein the liquid crystal layer has a splay structure when driving voltage is not applied and has a bend structure when driving voltage is applied.

18. A liquid crystal display device, comprising:

a first substrate;

a gate line on the first substrate;

a data line on the first substrate and crossing the gate line to define a pixel region;

a thin film transistor at a crossing of the gate and data lines;

a pixel electrode in the pixel region connected to the thin film transistor;

a first patterned spacer in a first direction on the first substrate including the pixel electrode;

a first alignment layer on an interior region of the first patterned spacer;

a second substrate spaced apart from and facing the first substrate;

a common electrode on a surface of the second substrate and facing the pixel electrode;

a second patterned spacer in a second direction on the common electrode and contacting the first patterned spacer;

a second alignment layer on an interior region of the second patterned spacer; and a liquid crystal layer interposed between the pixel electrode and the common electrode, wherein the first patterned spacer and the second patterned spacer cross each other with an angle more than 0 degrees, and wherein the first patterned spacer is parallel to the data line.

19. The device according to claim 18, wherein the second patterned spacer is parallel to the gate line.

20. The device according to claim 19, wherein the first and second patterned spacers cross each other at about a 90° angle.

21. A liquid crystal display device, comprising:

a first substrate;

a second substrate spaced apart from and facing the first substrate;

a liquid crystal layer interposed between the first and second substrate;

a first patterned spacer on the first substrate;

a second patterned spacer on the second substrate, the second spacer crossing the first spacer to form a gap between the first and second substrate; and first and second alignment layers on the first and second substrates respectively, wherein the first and second alignment layers are rubbed in substantially the same directions, and wherein the first and second alignment layers are on an interior region of the first patterned spacer and the second patterned spacer respectively.

22. The device according to claim 21, wherein the first and second spacers are substantially rectangular.

23. The device according to claim 22, further comprising first and second alignment layers on the first and second substrates, wherein the alignment layers are rubbed in a direction substantially perpendicular to a side of the spacers.

24. The device according to claim 23, wherein the first and second alignment layers are rubbed in substantially the same directions.

25. The device according to claim 23, wherein the first and second alignment layers are rubbed in different directions.

26. The device according to claim 22, further comprising first and second alignment layers on the first and second substrates, wherein the alignment layers are rubbed in a direction substantially along a diagonal of the spacers.

27. The device according to claim 26, wherein the first and second alignment layers are rubbed in substantially the same directions.

28. The device according to claim 26, wherein the first and second alignment layers are rubbed in different directions.

29. The device according to claim 21, wherein the thickness of the liquid crystal layer is equal to a sum of the thicknesses of the first and second spacers.

30. The device according to claim 21, further comprising:

a gate line on the first substrate;

a data line on the first substrate and crossing the gate line to define a pixel region;

a thin film transistor at a crossing of the gate and data lines;

a pixel electrode in the pixel region connected to the thin film transistor;

a common electrode on a surface of the second substrate and facing the pixel electrode;

the first alignment layer on the pixel electrode; and the second alignment layer on the common electrode.

* * * * *